United States Patent
Kubo et al.

[11] 3,861,669
[45] Jan. 21, 1975

[54] APPARATUS FOR FEEDING SHEET-LIKE ARTICLES FROM A STACK OF ARTICLES

[75] Inventors: Mitsuo Kubo, Tokyo; Toshio Yokosuka; Shunichi Nakajima, both of Yokohama, all of Japan

[73] Assignee: Tokyo Shibura Electric Co., Ltd., Kawasaki-shi, Japan

[22] Filed: June 13, 1973

[21] Appl. No.: 369,741

[30] Foreign Application Priority Data
June 15, 1972  Japan............................... 47-59740
June 15, 1972  Japan............................... 47-59741
June 15, 1972  Japan............................... 47-70749
June 15, 1972  Japan............................... 47-70750
June 15, 1972  Japan............................... 47-70754

[52] U.S. Cl.................................. 271/94, 271/104
[51] Int. Cl............................... B65h 3/12
[58] Field of Search.......... 271/94, 96, 104, 34, 35, 271/197, 196, DIG. 7, 121, 124, 167; 214/8.5 D, 8.5 G

[56] References Cited
UNITED STATES PATENTS

| | | | |
|---|---|---|---|
| 2,837,333 | 6/1958 | Sindzinski et al. | 271/96 UX |
| 2,845,267 | 7/1958 | Perssons | 271/34 |
| 2,905,309 | 9/1959 | Makrides | 271/96 X |
| 3,048,393 | 8/1962 | Furr et al. | 271/34 |
| 3,198,517 | 8/1965 | Martin | 271/197 |
| 3,620,526 | 11/1971 | Iles et al. | 271/96 |
| 3,708,058 | 1/1973 | Kalven | 271/197 X |
| 3,735,976 | 5/1973 | Watson | 271/96 |

*Primary Examiner*—Evon C. Blunk
*Assistant Examiner*—Bruce H. Stoner, Jr.
*Attorney, Agent, or Firm*—Flynn & Frishauf

[57] ABSTRACT

Apparatus for feeding or taking out sheet-like articles which comprises a vacuum suction device having a suction surface bored with suction openings; an endless belt designed to travel in contact with the suction surface and provided with a plurality of suction regions arranged at a prescribed interval so as to suck through suction holes of the suction regions sheet-like articles which contact the outer surface of the suction regions when the suction holes are brought over the suction openings of the suction surface of the vacuum suction device; and a feeding means for delivering sheet-like articles in succession to the endless belt for contact therewith, wherein the suction regions of the endless belt have a larger friction coefficient than any other surface portion of the belt.

11 Claims, 15 Drawing Figures

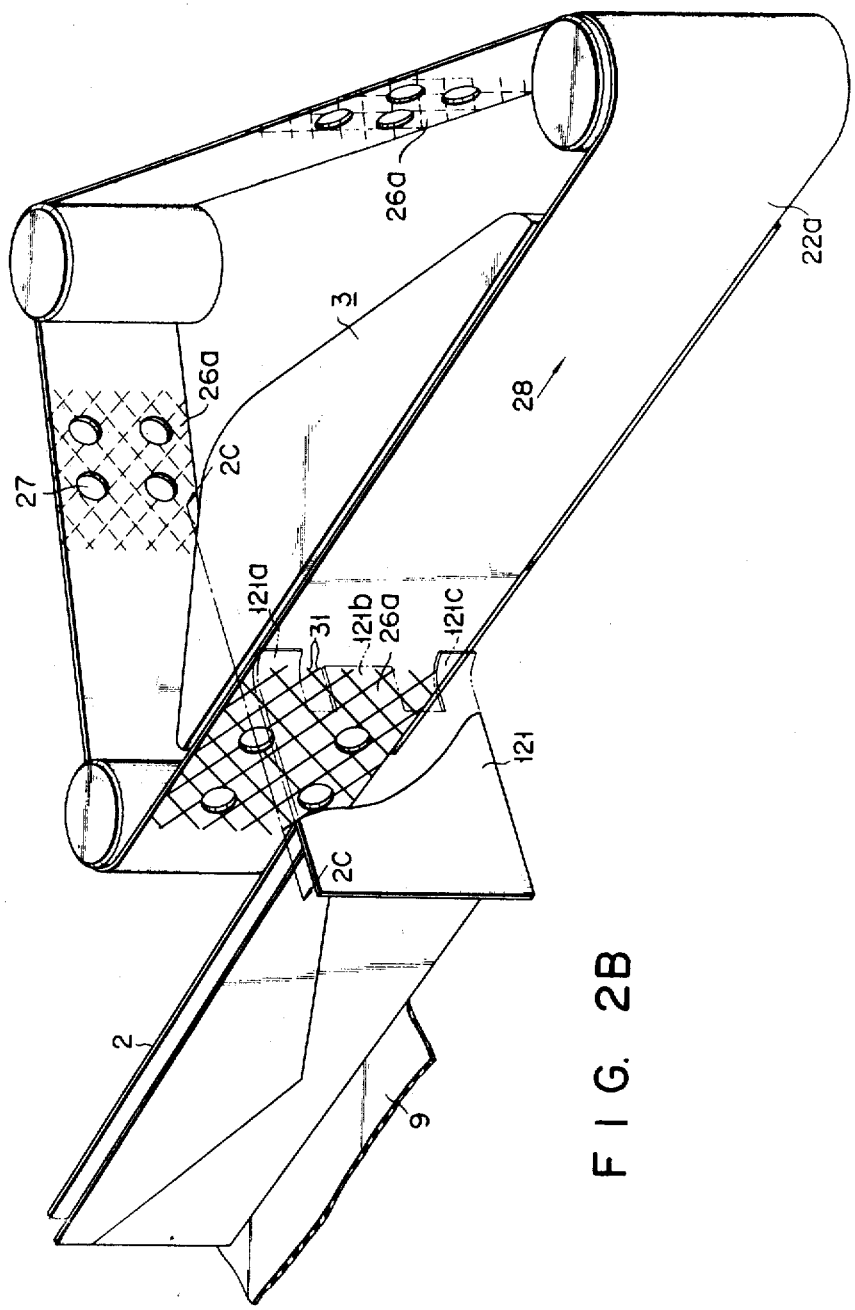

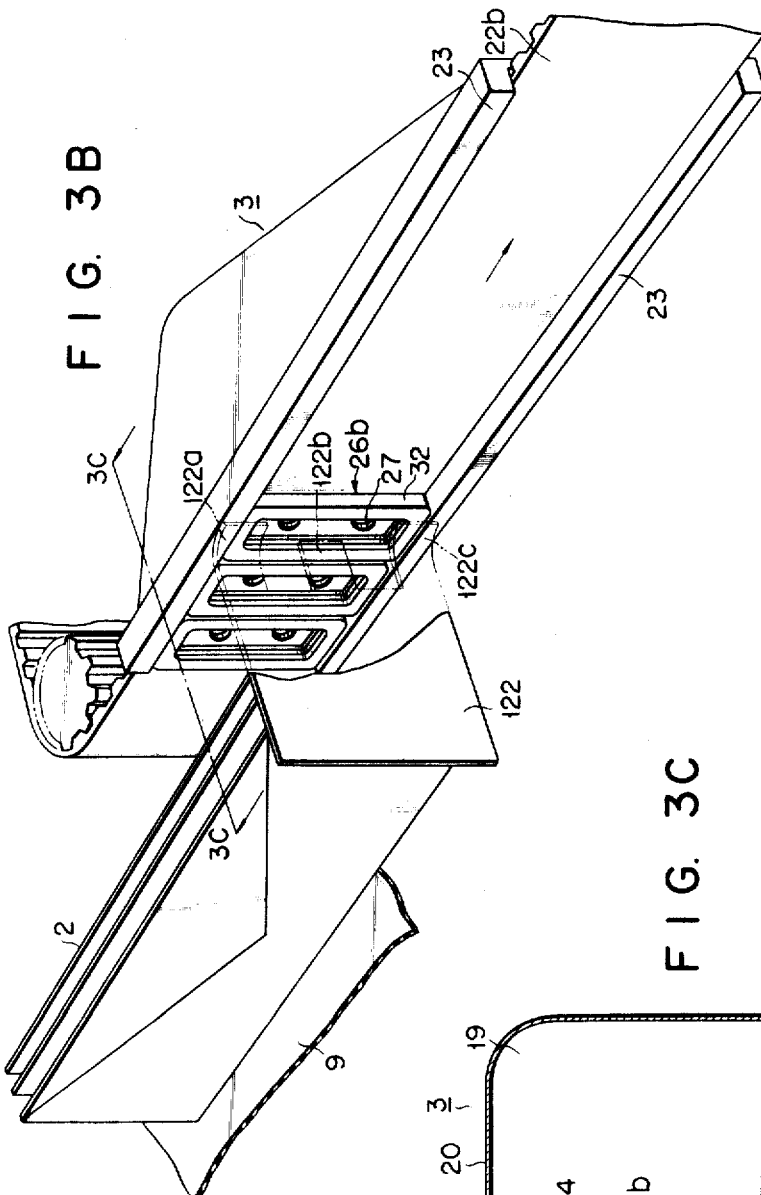
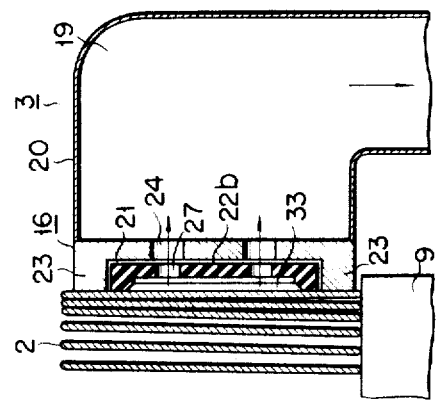

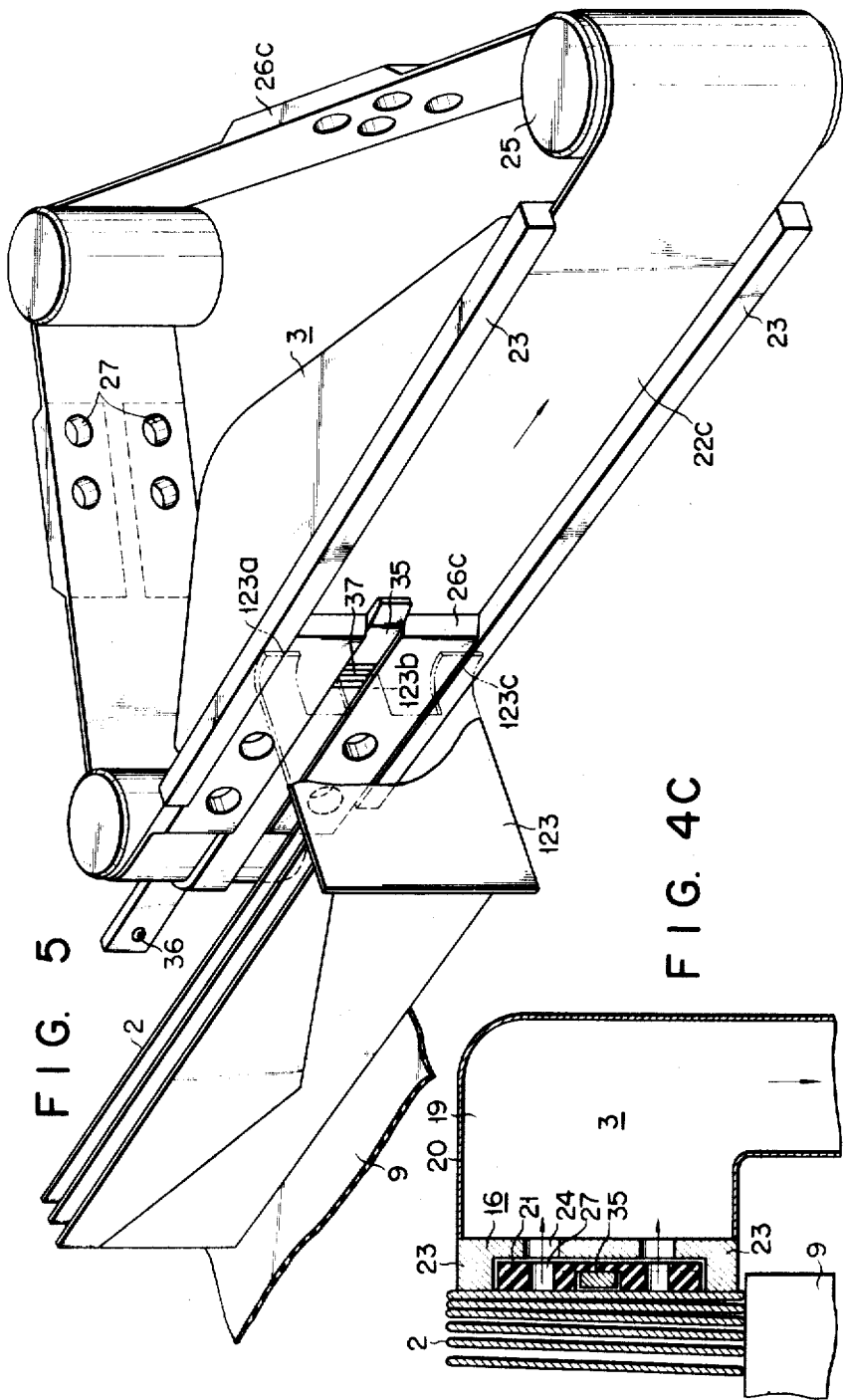

APPARATUS FOR FEEDING SHEET-LIKE ARTICLES FROM A STACK OF ARTICLES

This invention relates to an apparatus for unfailingly taking out one sheet-like article after another from a stack of said articles and more particularly to improvements in a belt adapted to effect the removal of such sheet-like articles.

In recent years, automation has been introduced in a series of steps distinguishing the types of sheet like-articles such as mail matter including enveloped writing, post cards, etc., impressing dates and other indications thereon and classifying the addresses of said mail matter, thereby reducing time and labor required for handling. For the aforesaid series of handling steps, there is provided an apparatus for feeding sheet-like mail articles automatically impressed with dates and other indications unfailingly one after another to an automatic reading and selecting machine. However, the apparatus of this invention can handle not only sheet-like mail matter but also similar articles.

Where relatively thick sheet-like articles, for example, are successively brought to the feeding machine, the customary practice is to drive an endless belt provided with a suction region so as to suck out one article after another.

In this case, the possibility of two sheet-like articles being sucked out simultaneously in a superposed state is prevented by the following known processes. Namely, there have been proposed a process of providing a reversible roller rotatable in the opposite direction to that in which the belt travels, in contact with the succeeding sheet-like article superposed on the foremost sheet-like article which should be taken out; a process of providing a baffle spring plate outside of the outer surface of the endless belt with a narrow gap allowed so as to permit the passage of only one sheet-like article; and a process of simply utilizing a gravitational force acting on the succeeding sheet-like articles. Now let it be assumed that a frictional force acting across the suction region of the belt and the foremost sheet-like article being taken out is designated as $F_1$, a frictional force acting across the foremost sheet-like article and the succeeding article superposed thereon as $F_2$ and a frictional force acting across the succeeding sheet-like article and the reversible roller or baffle board as $F_3$. Then if there is provided a condition attaining the relationship $F_1 > F_3 > F_2$, sheet-like articles will be fed out unfailingly one by one.

With the above-mentioned known processes (the process using gravitational force is now taken out of consideration due to its unstable operation), however, where a thick sheet-like article, for example, enveloped writing is brought to a feeding machine, then there will result $F_1 > F_3$, namely, the force which tends to move the foremost sheet-like article in the opposite direction to that in which it should travel will become greater than the force with which said foremost sheet-like article is sucked to the suction region of the belt, preventing the article from being fed or taken out. Conversely, where a thin sheet-like article, for example, a post card is supplied to the feeding or taking out machine, then there will occur the relationship $F_2 > F_3$, namely, a frictional force acting across the foremost and succeeding sheet-like articles will be stronger than a frictional force acting across the succeeding sheet-like article and reversible roller, causing both articles to be taken out in a superposed state.

It is accordingly the object of this invention to provide an apparatus for taking out or feeding sheet-like articles which can unfailingly remove only the foremost sheet-like article brought into contact with the suction region of the belt.

SUMMARY OF THE INVENTION

The apparatus of this invention for taking out sheet-like articles comprises a vacuum suction device having a suction surface with a plurality of suction openings therein; an endless belt having a plurality of suction regions, each suction region being perforated with a plurality of suction holes and arranged at a prescribed interval so as to suck sheet-like articles to the outer surface of the suction region when the suction holes thereof pass over the suction openings of the vacuum suction surface while the endless belt travels in contact with the suction surface of the vacuum suction device; a feeding means for conducting sheet-like articles in succession to the endless belt for contact therewith, and a baffle plate having a plurality of projections directed toward said belt passage, at least one of said projections being at substantially a right angle to said belt and being extended in the crosswise direction of said belt for defining at its end a predetermined gap width with the outer surface of said suction regions of said belt. The suction region of the endless belt has a larger coefficient of friction than any other surface portion of the belt.

This invention provides a particularly great frictional force acting across the suction region of the endless belt and the foremost sheet-like article and separates the succeeding sheet-like article superposed on the foremost one, thereby unfailingly taking out a series of sheet-like articles one by one when brought to the feeding machine. Provision of the baffle plate for obstructing the unnecessary travel of the succeeding sheet-like article superposed on the foremost sheet-like article already sucked to the suction region of the endless belt elevates the advantageous effect of this invention.

There are further preferably provided two parallel elongate guide members constituting a channel-shaped cross section and extending partly along the upper and lower edges of the endless belt respectively so as to receive the belt edges in the recess of said channel-shaped cross section. The suction surface of the vacuum suction device is positioned between the two guide members. The outer surfaces of the guide members are made substantially flush with the outer surface of the suction region of the endless belt, thereby causing the inner surfaces of the upper and lower end portions of a sheet-like article brought to the feeding machine in an upright position to be pressed against the outer surfaces of the guide members. Provision of the above-mentioned guide members further promotes the effect of this invention.

This invention can be more fully understood from the following detailed description when taken in connection with the accompanying drawings, in which:

FIGS. 1A–1C show a sheet-like article feeding or taking out apparatus according to a first embodiment of this invention; FIG. 1A is a plan view of the same; FIG. 1B is a perspective view of the same; and FIG. 1C is a cross sectional view on line 1C—1C of FIG. 1B;

FIGS. 2A–2C show a sheet-like article feeding or taking out apparatus according to a second embodiment of the invention; FIG. 2A is a plan view of the same;

FIG. 2B is a perspective view of the same; and FIG. 2C is a cross sectional view on line 2C—2C of FIG. 2B;

Figure 3A:
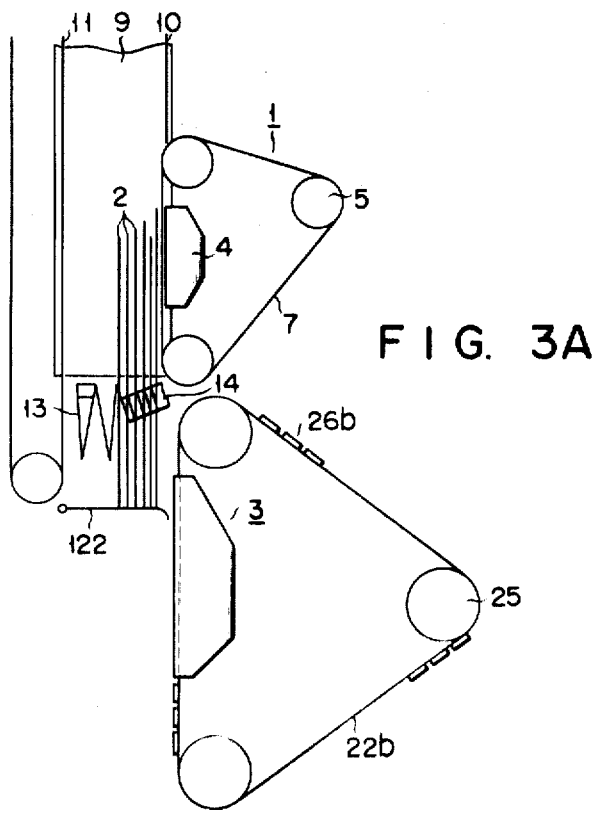
Figure 3D:
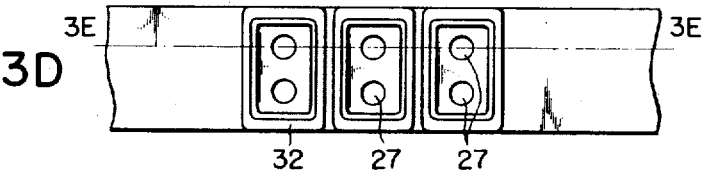
Figure 3E:
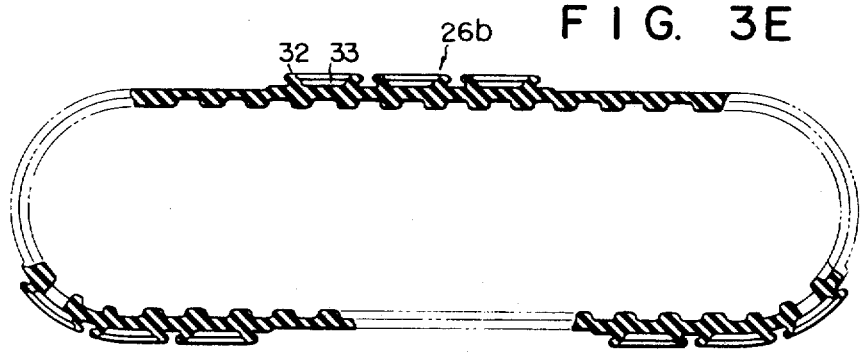
Figure 4A:
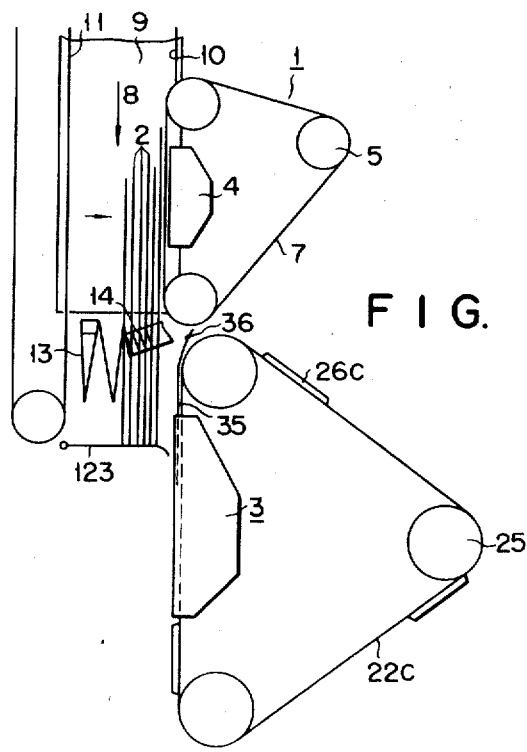
Figure 4B:
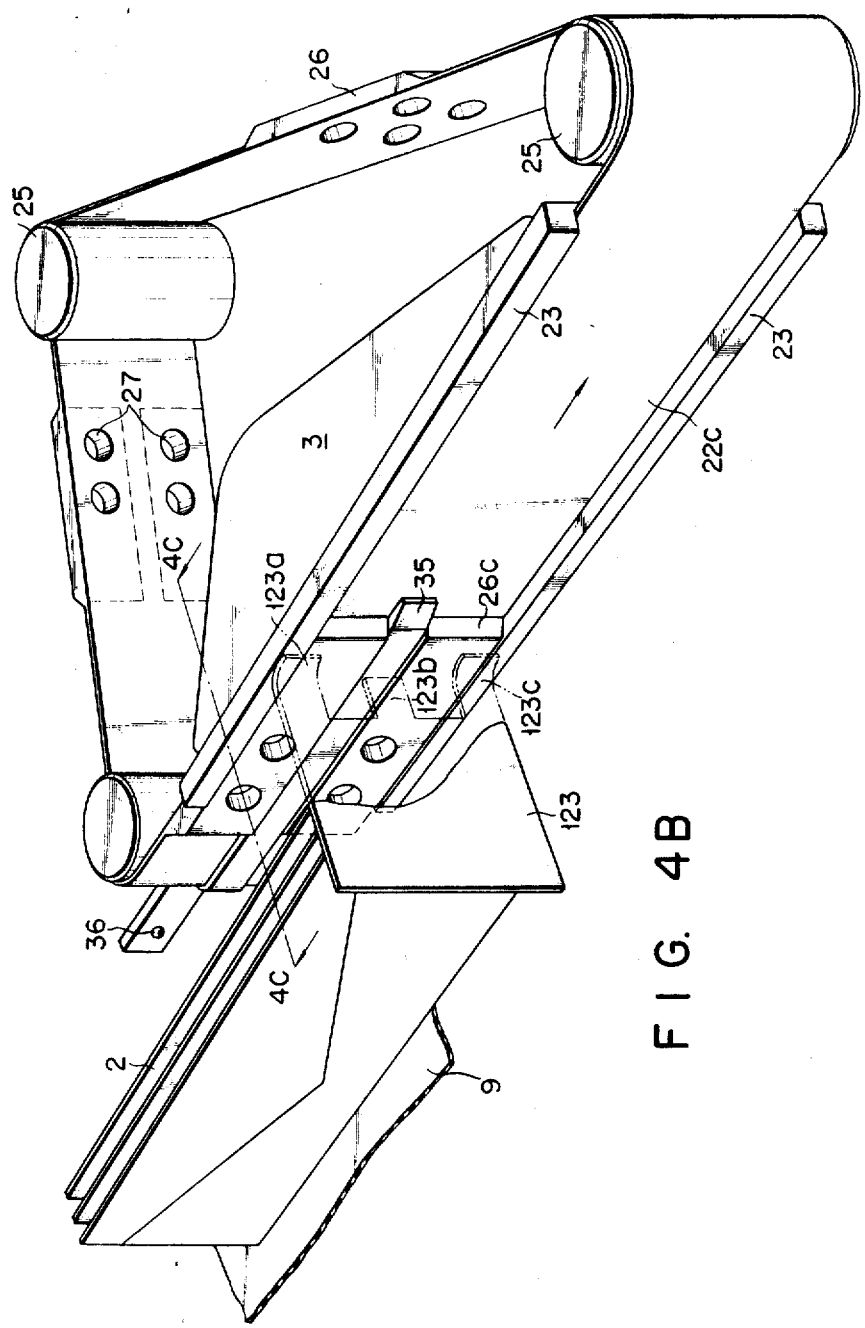

FIGS. 3A-3E illustrate a sheet-like article feeding or taking out apparatus according to a third embodiment of the invention; FIG. 3A is a plan view of the same; FIG. 3B is a perspective view of the same; FIG. 3C is a cross sectional view on line 3C—3C of FIG. 3B; 3D is an enlarged plan view of the suction region of the endless belt; and FIG. 3E is a cross sectional view on line 3E—3E of FIG. 3D;

FIGS. 4A-4C illustrate a sheet-like article feeding or taking out apparatus according to a fourth embodiment of the invention; FIG. 4A is a plan view of the same; FIG. 4B is a perspective view of the same; and FIG. 4C is a cross sectional view on line 4C—4C of FIG. 4B; and FIG. 5 is a perspective of a sheet-like article selecting apparatus according to a fifth embodiment of the invention.

Figure 1A:
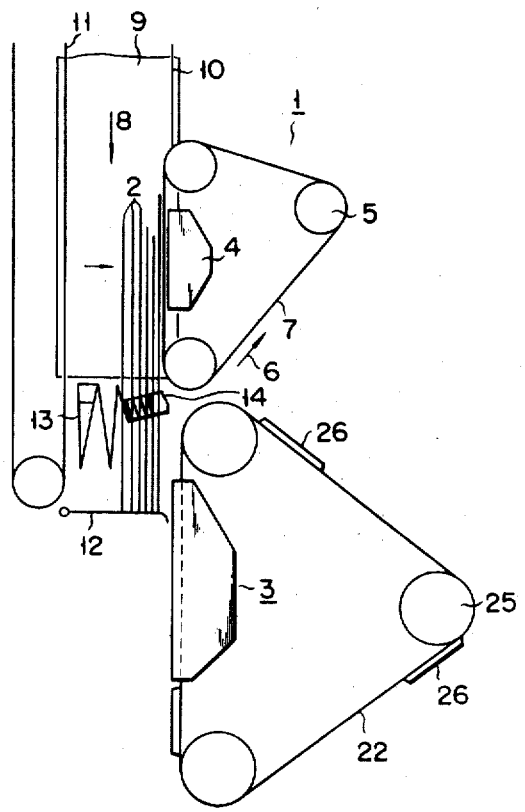

Throughout the drawings, the same parts are denoted by the same numerals. Referring to FIG. 1A, a sheet-like article feeding device 1 brings sheet-like articles (enveloped mail articles in this embodiment) delivered from an automatic stamping machine (not shown) to an area in front of the suction surface of a vacuum suction device 3. The feeding device 1 comprises a supplementary suction means 4; a belt 7 stretched around rollers 5 and driven in the direction of the indicated arrow 6; a belt 9 for conducting enveloped mail articles from the stamping machine in the direction of the indicated arrow 8; a guide board 10; and a guide belt 11.

Sheet-like mail articles are delivered to a selecting machine in an upright position by means of the guide board 10 and guide belt 11. A baffle spring plate 12 fixed at one end causes mail articles 2 to rest at the indicated position. Below a space defined between the forward end portion of the belt 9 and the baffle spring plate 12 are provided a helical coil 13 and a screw 14. Rotations of coil 13 and screw 14 cause collected sheet-like articles 2 aligned at one end by the baffle spring plate 12 to be pressed toward the supplementary suction means 4. When the part of the belt 7 bored with suction holes registers with or contacts, while travelling, the suction surface of the supplementary suction means 4, the sheet-like articles 2 have their rear end gently sucked by said supplementary suction means 4.

Figure 1B:
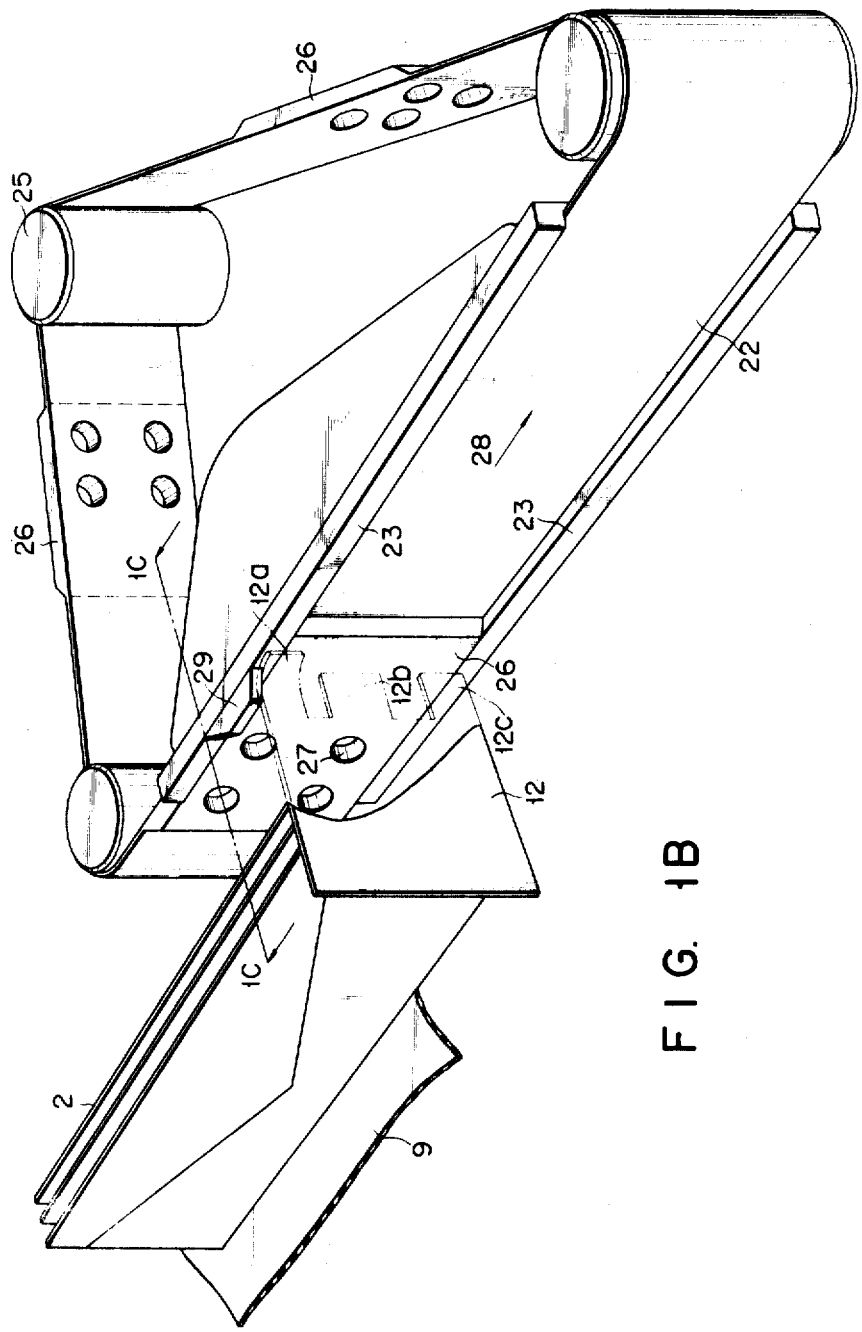
Figure 1C:
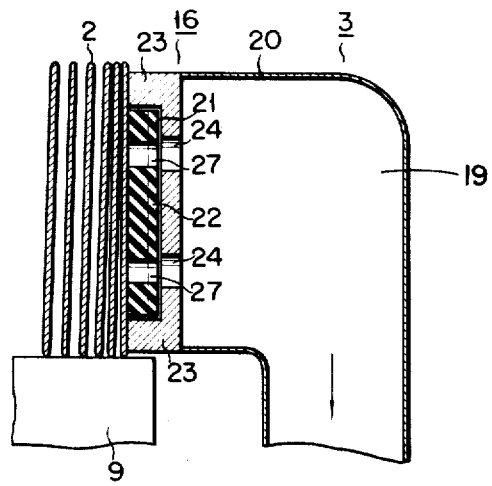

As shown in FIGS. 1B and 1C, the vacuum suction device 3 includes a face plate 16 and a cover 20 surrounding the periphery of the face plate 16 so as to define a vacuum chamber 19, which communicates with a vacuum pump (not shown). In the outer surface of the face plate 16 is formed a rectangular recess 21, whose bottom constitutes a suction surface substantially contacted by the inner surface of the later described belt 22. Both upper and lower edges of the belt 22 are fitted within two projecting guide members 23 which extend lengthwise of the belt 22. The face plate 16 is perforated with narrow suction openings 24 extending along the travelling course of the belt 22 so as to effect communication between the recess 21 and vacuum chamber 19. The belt 22 is stretched around rollers 25 and so driven as to pass through the recess 21 in contact with the suction surface of the supplementary suction means 3.

The belt 22 has a plurality of outwardly projecting suction regions 26 arranged with a prescribed interval or spacing between adjacent suction regions 26. The outer surface of the projecting suction region 26 is made substantially flush with the outer surface of the guide member 23. The projecting suction region 26 may be prepared by bonding to the belt 22, for example, polyurethane rubber having a larger friction coefficient than any other outer surface portion of the belt 22. The projecting suction region 26 has a plurality of suction holes 27 therein. While the belt 22 is travelling, the suction holes 27 are periodically aligned with suction openings 24. The body of the belt is coated with, for example, a cloth of nylon, polyester or Teflon which has a smaller friction coefficient than that of the suction regions 26.

The baffle spring plate 12 has its free side provided, as shown in FIG. 1B, with three projections 12a, 12b and 12c. The upper projection 12a has its end bent in the travelling direction of the belt 22 so as to gently contact the outer surface of the guide members 23 or define a very small gap therewith, thereby preventing the forward end portion of sheet-like articles 2 sucked by the projecting suction region 26 of the belt 22 from being folded and also gently pressing said forward end portion against the suction region 26. On the other hand, the middle and lower projections 12b and 12c are not bent.

These projections 12b and 12c have their ends so adjusted in position as to define a prescribed narrow space with the outer surface of the projecting suction region 26 when said outer surface passes said projections 12b and 12c, thereby preventing the foremost and succeeding sheet-like mail articles from being carried through said narrow space in a superposed state. Namely, the middle and lower projections 12b and 12c prevent the succeeding sheet-like mail article being supplied next time to the belt 22 from being moved forward together with the foremost article. That part (shown in the upper left hand side of FIG. 1B) of the outer surface of the upper guide member 23 which faces the suction region 26 of the belt 22 is fitted with an outward extending projection 29. This projection 29 is so positioned as to gently touch the upper edge of a sheet-like mail article sucked by the suction region 26 of the belt 22, so that should the foremost and succeeding articles be brought to said suction region 26 in a superposed state, then the projection 29 slightly bends the upper edges of both articles to provide a gap therebetween, thereby enabling only the foremost article to be easily taken out. Among the sheet-like mail articles 2 successively brought to the selecting machine with the forward ends aligned by the baffle spring plate 12, the foremost article has its rear end sucked by the supplementary suction means 4 with the upper and lower edges of the forward end portion of said foremost article pressed against the outer surface of the upper and lower guide members 23. Where, at this time, the projecting suction region 26 of the belt 22 passes the suction surface of the vacuum suction device 3 in contact therewith, then the foremost sheet-like mail article is conducted thrugh a gap defined by the middle and lower projections 12b and 12c of the baffle spring plate 12 with the outer surface of the suction region 26 of the belt 22 while being sucked by the vacuum suction device 3 and thereafter delivered to the following handling section. Should, at this time, the succeeding sheet-like mail article tend to pass through the aforesaid gap in a state superposed on the foremost article already sucked by the suction region 26 of the belt 22, then said succeeding article will have its upper edge alone pressed against the upper guide member 23 by the projection 12a of the baffle spring plate 12 but its forward end arrested by the projections 12b and 12c thereof, and consequently will never be taken out together with the foremost mail article. The succeeding mail article remains in the above-mentioned condition until the following suction region 26 of the belt 22 arrives. The succeeding mail article which now takes the foremost position is sucked by said following suction region 26 for removal. Since the suction region 26 of the belt 22 has a larger coefficient of friction than the body of the belt 22, the foremost mail article is fed out only when it faces the suction region 26. Should the foremost mail article contact any other outer surface portion of the belt 22 than the suction region 26, it will not be fed out, because the coefficient of friction between the foremost and succeeding articles is greater than that between said foremost article and any other outer surface portion of the belt 22 than the suction region 26.

Other features of the apparatus of this invention are that sheet-like mail articles are least likely to contact any other surface portion of the belt 22 than the suction region 26, minimizing damage to the mail articles and that since sheet-like mail articles are fed out in succession only when sucked by the suction region 26 of the belt 22, said removal can be effected at a very accurate time interval between successive fed out articles.

Figure 2A:
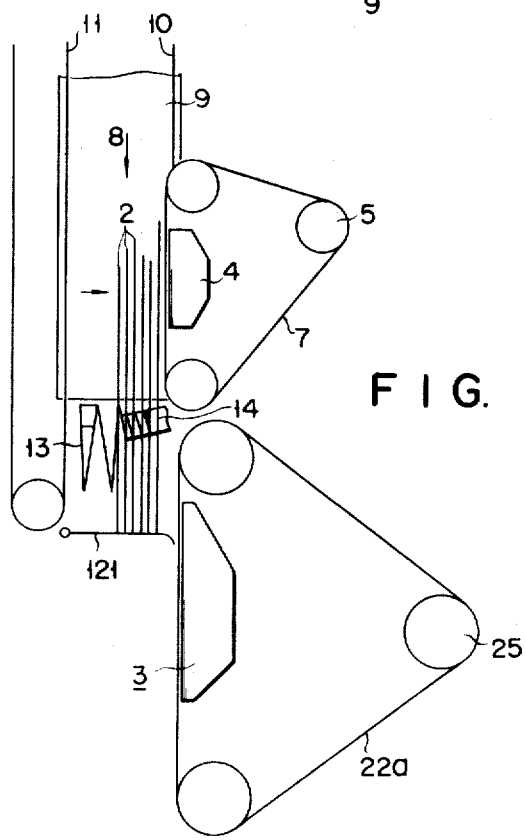
Figure 2C:
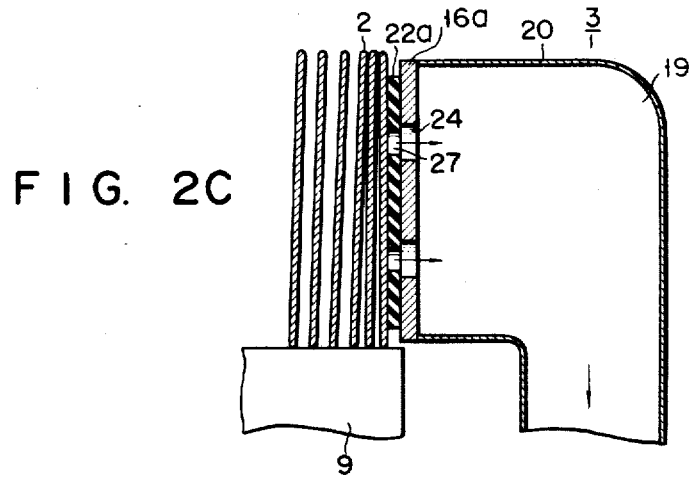

FIGS. 2A, 2B and 2C jointly illustrate a second embodiment of this invention in which the belt 22 and the face plate of the vacuum suction device 3 have different arrangements from those of FIG. 1. As is apparent from FIG. 2B, the suction region 26a of the belt 22a includes a plurality of grooves 31 cut out in the surface in the lattice form in place of the projections 26 of FIG. 1B. Though the body of the belt 22a is coated with a cloth of, for example, nylon, polyester or Teflon, the outer surface of the suction region 26a obviously has a larger coefficient of friction due to the irregularities of said surface than any other outer surface portion of the belt 22a. The face plate 16a (FIG. 2C) of the vacuum suction device 3 is not fitted with guide members 23 as in FIG. 1. The baffle spring plate 121 has its free side provided with three projections 121a, 121b and 121c, of which 121a and 121c have the end bent in the travelling direction of the belt 22a. The remaining projection 121b is not bent, but is intended to prevent the foremost and succeeding sheet-like mail articles to be fed out together in a superposed state. The projections 121a and 121c prevent the forward end of the foremost mail article form being bent. Where the foremost and succeeding mail articles are brought to the feeding machine in a superposed state, the projection 121b arrests the forward end of the succeeding mail article and keeps it in a waiting condition until the following suction region 26a of the belt 22a arrrives. The second embodiment of FIG. 2 is operated with the same effect as that of FIG. 1.

FIGS. 3A-3E jointly illustrate a third embodiment of this invention. As seen from FIGS. 3A and 3B, the suction region 26b of the belt 22b comprises three suction boards, each including a peripheral portion 32 surrounding two suction holes 27 and projecting outward from the outer surface of the belt 22b bored with the suction holes 27. The peripheral portion 32 of the suction region 26b is flexible, enabling a sheet-like mail article 2 to be sucked over a broad area by the suction region 26b. A sheet-like mail article 2 is deeply sucked into a hollow portion 33 defined by the peripheral portion 32 to present a curved state. Should, therefore, the foremost and succeeding sheet-like mail articles 2 be brought to the feeding machine in a superposed state, the foremost article will be curved to a greater degree than the succeeding one, giving rise to a gap therebetween, so that the foremost article alone will be easily fed out. The projections 122a and 122c press the upper and lower edges of the forward end portion of a sheet-like mail article ready to be sucked by the suction region 26b. Should the foremost and succeeding mail articles be brought to the feeding machine in a superposed state, the projections 122a and 122c jointly act to allow the foremost article alone to be fed out and keep the succeeding article in a waiting position until the following suction region 26b arrives, utilizing a great frictional force applied between the foremost article and the outer surface of the suction region 26b. The projection 122b defines with the outer surface of the suction region 26b such a narrow gap as prevents two sheet-like mail articles from being fed out together. It will be noted that the number and shape of suction boards are not limited to those described in the third embodiment of FIGS. 3A-3E. For example, the whole suction region 26b of the endless belt 22b may consist of a single suction board. According to this embodiment, the endless belt has a toothed portion formed on backside, baside, and each of the rollers 25 supporting the belt 22b is also provided with a toothed portion on the peripheral surface. Therefore, engagement between these two toothed portions enables sheet-like articles to be fed out with very accurate timing. Obviously, the outer surface of the suction region 26b of the belt 22b has a larger coefficient of friction than any other outer surface portion of the belt 22b.

FIGS. 4A-4C shows a fourth embodiment of this invention. According to this embodiment, there is disposed in front of the suction surface of the vacuum suction device lever 35 fixed at one end 36 and extending parallel with the endless belt 22c. The suction region 26c of the endless belt 22c comprises two upper and lower sections outwardly projecting from the body of the belt 22c and divided by a recess extending along the lengthwise central line of the belt 22c for the full length of said two sections, the bottom portion of said recess being constituted by the body of the belt 22c. The outer surface of the suction region 26c of the belt 22c is made flush with the outer surface of the upper and lower guide member 23. The inner surface of the lever 35 spatially faces the bottom surface of the aforesaid recess, permitting the free travel of the belt 22c. The outer surface of the lever 35 is made slightly lower than the outer surface of the upper and lower guide members 23.

Of the projections 123a, 123b and 123c of the baffle spring plate 123, the projections 123a and 123c have their free end bent in the travelling direction of the belt 22c so as to gently contact the outer surface of the guide members 23 or define a suitable gap with said outer surface. The free end of the remaining projection 123b defines a proper gap with the outer surface of the lever 35. The projections 123a and 123c have the same function as described in the embodiment of FIG. 3. The projection 123b has substantially the same width as the lever 35. Provision of the lever 35 more elevates the effect of this invention. Namely, a sheet-like mail article having the upper and lower edges contacted by the upper and lower guide members 23 respectively are arrested by the lever 35 and prevented from having the central portion of the mail article from being pressed against any outer surface portion of the belt 22c other than the suction region 26c. Accordingly, sheet-like mail articles collected in front of the feeding machine can be fed out unfailingly one by one at the prescribed time interval. The projection 123b is intended to prevent the foremost and succeeding sheet-like mail articles from being jointly fed out and also attain the periodical removal of each article.

FIG. 5 illustrates a fifth embodiment of this invention, which differs from that of FIGS. 4A–4C in that the outer surface of the lever 35 partly includes a section 37 having a larger coefficient of friction than the other surface portions of the lever 35. Said section 37 has a plurality of grooves cut out crosswise of the lever 35 and collectively presenting a saw-toothed shape in cross section. The projection 123b of the baffle spring plate 123 faces said section 37 having a large coefficient of friction. According to the embodiment of FIG. 5, sheet-like mail articles are successively made ready for the arrival of the suction region 26c in a state pressed against said section 37 by the projection 123b, and are fed out unfailingly one by one. Further, if a sheet-like mail article happens to be curved with the resultant contact with any other outer surface portion of the belt 22c than the suction region 26c, then the projection 123b will surely prevent said curved sheet-like article from being fed out. Obviously, the outer surface of the suction region 26c has a larger coefficient of friction than any other outer surface portion of the belt 22c.

What we claim is:

1. Apparatus for feeding or taking out sheet-like articles comprising:
   a vacuum suction device having a suction surface with a plurality of suction openings therein;
   an endless belt having a plurality of suction regions, each suction region being perforated with a plurality of suction holes and arranged at a predetermined interval along said belt so as to suck sheet-like articles to the outer surface of said suction region when the suction holes thereof pass over the suction openings of the vacuum suction surface while the endless belt travels in contact with the suction surface of the vacuum suction device, said suction region of said belt having a larger coefficient of friction than any other surface portion of said belt;
   feeding means for conducting sheet-like articles in succession to the endless belt for contact therewith; and
   a baffle plate having a plurality of projections directed toward said belt passage, at least one of said projections being at substantially a right angle to said belt and being extended in the crosswise direction of said belt for defining at its end a predetermined gap width with the outer surface of said suction regions of said belt.

2. Apparatus according to claim 1 wherein said baffle plate is made of elastic material.

3. Apparatus according to claim 1 wherein the outer surfaces of the suction regions of the belt are substantially flush with that of any other outer surface portion of the belt.

4. Apparatus according to claim 3 wherein the outer surfaces of the suction regions of the belt have a plurality of irregularities therein, said irregularities comprising a plurality of mutually intersecting grooves cut in said outer surfaces.

5. Apparatus according to claim 1 wherein the outer surfaces of the suction regions of the belt outwardly project from the body of the belt.

6. Apparatus according to claim 5 wherein said suction regions comprise at least one suction board including a flexible peripheral portion surrounding at least one suction hole of the belt and projecting outward from the outer surface of the belt having said suction holes therein.

7. Apparatus according to claim 1 comprising upper and lower guide members extending partly along the upper and lower edges of the travelling belt respectively, the suction surface of the vacuum suction device being disposed between said guide members; and wherein the outer surfaces of said guide members is substantially flush with the outer surfaces of the suction regions of the belt.

8. Apparatus according to claim 7 wherein said baffle plate has first, second and third projections, said first and third projections defining at their ends a predetermined gap width with the outer surfaces of said upper and lower guide members respectively; and said first projection which faces the upper guide member having its end bent in the travelling direction of the belt.

9. Apparatus according to claim 1 further comprising upper and lower guide members which extend partly along the upper and lower edges of the travelling belt respectively, to receive the suction surface of the vacuum suction device therebetween, the outer surfaces of the upper and lower guide members being substantially flush with the outer surfaces of the suction regions of the belt; a fixed lever disposed in front of the suction surface of the vacuum suction device and extending substantially parallel with the belt; and wherein each of said suction regions of the belt project outwardly from the body of the belt and further has a recess extending lengthwise of said suction region for its full length, the inner surface of the lever closely facing said recess, the outer surface of the lever being lower than the outer surface of the outwardly projecting guide members, and said baffle plate having first, second and third projections, said second projecting defining at its end a prescribed gap width with the outer surface of the lever.

10. Apparatus according to claim 9 wherein the recesses of the suction regions of the belt extend along the lengthwise central line of the belt.

11. Apparatus according to claim 9 wherein the outer surface of the lever has a section having a larger coefficient of friction than any other outer surface portion of the lever; and said second projection of said baffle plate is disposed to face said section of large coefficient of friction.

* * * * *